US012558773B2

(12) United States Patent
Ashcraft

(10) Patent No.: US 12,558,773 B2
(45) Date of Patent: Feb. 24, 2026

(54) PROFILE MATCHING SCRIBING TOOL AND ASSOCIATED METHODS

(71) Applicant: Jack Ashcraft, Silver Star, MT (US)

(72) Inventor: Jack Ashcraft, Silver Star, MT (US)

( * ) Notice: Subject to any disclaimer, the term of this patent is extended or adjusted under 35 U.S.C. 154(b) by 372 days.

(21) Appl. No.: 18/453,760

(22) Filed: Aug. 22, 2023

(65) Prior Publication Data

US 2025/0065488 A1 Feb. 27, 2025

(51) Int. Cl.
*B25H 7/04* (2006.01)

(52) U.S. Cl.
CPC .................................... *B25H 7/045* (2013.01)

(58) Field of Classification Search
CPC ...................................................... B25H 7/045
USPC ....... 33/18.1, 32.1, 32.2, 32.3, 34, 483, 484, 33/485
See application file for complete search history.

(56) References Cited

U.S. PATENT DOCUMENTS

| | | | | | | |
|---|---|---|---|---|---|---|
| 285,304 | A | * | 9/1883 | Pearson | B25B 13/48 | 33/DIG. 16 |
| 392,143 | A | * | 10/1888 | Wright | G01B 5/061 | 33/32.2 |
| 833,168 | A | * | 10/1906 | Keller | B25H 7/04 | 33/666 |
| 1,100,878 | A | * | 6/1914 | Higgins et al. | G01B 5/061 | 33/32.2 |
| 2,026,768 | A | * | 1/1936 | Aronson | B43L 7/005 | 33/485 |
| 2,155,885 | A | * | 4/1939 | Baxter | C03B 33/027 | 33/32.2 |
| 2,323,649 | A | * | 7/1943 | Davis | B41G 3/00 | 33/32.3 |
| 2,402,890 | A | * | 6/1946 | Hochreiter | B25H 7/00 | 33/21.1 |
| 2,557,699 | A | * | 6/1951 | Silver | B25H 7/04 | 33/41.5 |
| 2,964,848 | A | * | 12/1960 | Gonsalves | C03B 33/12 | 33/430 |
| 3,626,595 | A | * | 12/1971 | Hulen | B43L 13/02 | 33/32.2 |
| 4,197,649 | A | * | 4/1980 | Flinn | B43L 7/00 | 33/488 |
| 4,451,993 | A | * | 6/1984 | Yauk | G01B 3/02 | 33/495 |

(Continued)

FOREIGN PATENT DOCUMENTS

| | | | | | |
|---|---|---|---|---|---|
| GB | 2465636 | A | * | 6/2010 | B25H 7/04 |
| JP | H04131703 | U | * | 12/1992 | |

*Primary Examiner* — George B Bennett
(74) *Attorney, Agent, or Firm* — Collaborative IP; Paul Ditmyer

(57) ABSTRACT

The profile matching scribing tool includes an elongated body including walls defining an interior guide within the elongated body and having at least a first opening at one end of the elongated body, and an elongated scribing element, including a pointed tip, and positioned in the interior guide within the elongated body and configured to be slidably extended out of the first opening. A marking tool guide holder is positioned on a top of the elongated body adjacent an end thereof and configured to guide and hold a marking tool transverse to the length of the elongated body, and a marking tool storage holder is positioned on the elongated body and configured to store and hold the marking tool when not in use. Also, first and second level indicators are positioned perpendicular to each other on the top of the elongated body.

20 Claims, 3 Drawing Sheets

(56) References Cited

U.S. PATENT DOCUMENTS

| | | | | | |
|---|---|---|---|---|---|
| 4,648,185 | A * | 3/1987 | Brandimarte | B25H 7/04 | 33/669 |
| 4,823,148 | A * | 4/1989 | Sieber | G01D 9/40 | 401/48 |
| 4,979,304 | A * | 12/1990 | Sprague | B26B 29/06 | 30/294 |
| 5,208,988 | A * | 5/1993 | Edelman | A41H 9/00 | 33/32.3 |
| 5,309,642 | A * | 5/1994 | McGinnis | B26B 29/06 | 33/476 |
| 5,446,969 | A * | 9/1995 | Terenzoni | B25H 7/00 | 33/421 |
| 6,029,362 | A * | 2/2000 | Miodragovic | B25H 7/00 | 33/483 |
| 6,199,288 | B1 * | 3/2001 | Gregory | B25H 7/02 | 33/484 |
| 6,427,344 | B1 * | 8/2002 | Smith | B43L 9/007 | 33/483 |
| 6,915,588 | B1 * | 7/2005 | Gay | G01C 9/28 | 33/485 |
| 7,254,855 | B2 * | 8/2007 | McCreesh | G01B 3/04 | 7/164 |
| 7,895,760 | B1 * | 3/2011 | Bareis | B43L 13/00 | 33/483 |
| 8,272,136 | B2 * | 9/2012 | Vogeler | B43L 9/007 | 30/286 |
| 8,458,916 | B2 * | 6/2013 | Aplin | B43L 9/007 | 33/485 |
| 9,085,079 | B2 * | 7/2015 | Manohar | B25H 7/04 | |
| 10,194,760 | B2 * | 2/2019 | Frazier, Jr. | A47G 1/205 | |
| 10,744,614 | B1 * | 8/2020 | Allison | B24D 15/08 | |
| 11,273,550 | B2 * | 3/2022 | Freitag | B23C 5/02 | |
| 12,427,646 | B2 * | 9/2025 | Leen | B25H 7/04 | |
| 2003/0145476 | A1 * | 8/2003 | Chen | B43L 7/00 | 33/484 |
| 2007/0240317 | A1 * | 10/2007 | Nicholson | B43L 13/02 | 33/32.3 |
| 2010/0050452 | A1 * | 3/2010 | Wei | B43L 7/00 | 33/483 |
| 2014/0026725 | A1 * | 1/2014 | Makropoulos | B27B 9/04 | 83/13 |
| 2024/0151526 | A1 * | 5/2024 | Kolitsch | B25H 7/04 | |

* cited by examiner

PROFILE MATCHING SCRIBING TOOL AND ASSOCIATED METHODS

FIELD

The present invention relates in general to the field of construction tools, and particularly to a profile matching scribing tool.

BACKGROUND

In various fields, such as woodworking, construction, and manufacturing, accurately replicating complex shapes and profiles is a critical task. The profile matching scribing tool is a versatile instrument designed to facilitate this process with precision and efficiency. By allowing users to capture and transfer intricate profiles onto desired materials, this tool has become an indispensable asset in numerous industries.

Profile matching scribing tools are handheld devices that enable the transfer of complex shapes and profiles from one object to another. They typically consist of a body with adjustable arms or guides, a scribing element, and a locking mechanism. The tool's primary purpose is to replicate intricate contours accurately, allowing the user to mark or cut the desired shape on a different material. Profile matching scribing tools often feature adjustable arms or guides that can be extended or retracted to match the width or curvature of the profile being replicated. This flexibility ensures precise and adaptable profiling capabilities.

The scribing element, usually a sharp or pointed tip, is the main component responsible for tracing the profile onto the target material. It creates a clear and visible guideline for subsequent operations. To maintain the set profile throughout the transfer process, profile matching scribing tools incorporate a locking mechanism that securely holds the adjustable arms or guides in place. This stability is crucial in achieving accurate and consistent results.

In carpentry, profile matching scribing tools enable craftsmen to precisely replicate intricate designs, moldings, or irregular shapes. This allows for seamless fitting of new components with existing structures. Architects, contractors, and construction professionals use profile matching scribing tools to transfer complex profiles for molding installation, trim work, or fitting irregular surfaces. In metal fabrication and welding, profile matching scribing tools aid in replicating complex shapes on metal sheets or pipes. This ensures accurate cutting, bending, or welding processes. Profile matching scribing tools are valuable in automotive and aerospace industries for replicating intricate contours, such as door panels, instrument clusters, or airfoil profiles, onto different materials or prototypes.

Profile matching scribing tools offer a high degree of accuracy, allowing for precise replication of complex profiles. This reduces the likelihood of errors and improves overall craftsmanship. By simplifying the transfer of profiles, these tools save valuable time compared to traditional manual methods, enhancing productivity and workflow efficiency. Profile matching scribing tools can adapt to various shapes and materials, making them suitable for a wide range of applications across different industries.

While profile matching scribing tools provide precision, achieving optimal results still requires skill and technique. Users must be proficient in handling the tool to ensure accurate profile transfer. Certain materials with uneven surfaces or complex contours, such as log cabin walls, may pose challenges when using profile matching scribing tools. It is important to consider the material's compatibility and adaptability to the tool's functionality.

This background information is provided to reveal information believed by the applicant to be of possible relevance to the present invention. No admission is necessarily intended, nor should be construed, that any of the preceding information constitutes prior art against the present invention.

SUMMARY OF THE EMBODIMENTS

An object of the present invention may be to provide a carpentry and masonry marking tool that is adjustable from almost zero to a foot, and includes horizontal and vertical levels to ensure plumb/level throughout the marking process, especially when marking against an uneven surface such as log walls for drywall, cabinets, trim, and tile installation.

Objects and features of the invention may be provided by a profile matching scribing tool including an elongated body including walls defining an interior guide within the elongated body and having at least a first opening at one end of the elongated body, and an elongated scribing element, including a pointed tip, and positioned in the interior guide within the elongated body and configured to be slidably extended out of the first opening. A marking tool guide holder is positioned on a top of the elongated body adjacent an end thereof and configured to guide and hold a marking tool transverse to the length of the elongated body, and a marking tool storage holder is positioned on the elongated body and configured to store and hold the marking tool when not in use. Also, first and second level indicators are positioned perpendicular to each other on the top of the elongated body.

Additionally, and/or alternatively, a scribing element tightening device is configured to secure the elongated scribing element at a selected position in the interior guide within the elongated body.

Additionally, and/or alternatively, a marking tool tightening device is positioned on the marking tool guide holder and configured to secure the marking tool within the marking tool guide holder.

Additionally, and/or alternatively, the interior guide extends the length of the elongated body and includes a second opening at an opposite end of the elongated body.

Additionally, and/or alternatively, the elongated scribing element is configured to be selectively extended out of either of the first and second openings of the interior guide within the elongated body.

Additionally, and/or alternatively, the elongated scribing element is substantially the same length as the elongated body.

Additionally, and/or alternatively, the elongated scribing element is secured in the interior guide within the elongated body by a slidable resistance that is configured to be overcome by a user when adjusting a position of the elongated scribing element.

Another embodiment is directed to a profile matching scribing tool including an elongated body including walls defining an interior guide that extends the length of the elongated body and includes a first opening and a second opening at opposite ends of the elongated body, and an elongated scribing element, including a pointed tip, and positioned in the interior guide within the elongated body and configured to be selectively and slidably extended out of the first and second openings. A marking tool guide holder is positioned on a top of the elongated body adjacent an end thereof and configured to guide and hold a marking tool transverse to the length of the elongated body. At least one level indicator is positioned on the top of the elongated body.

Additionally, and/or alternatively, a scribing element tightening device is configured to secure the elongated scribing element at a selected position in the interior guide within the elongated body.

Additionally, and/or alternatively, a marking tool tightening device is positioned on the marking tool guide holder and configured to secure the marking tool within the marking tool guide holder.

Additionally, and/or alternatively, a marking tool storage holder is positioned on the elongated body and configured to store and hold the marking tool when not in use.

Additionally, and/or alternatively, the elongated scribing element is substantially the same length as the elongated body.

Additionally, and/or alternatively, the elongated scribing element is secured in the interior guide within the elongated body by a slidable resistance that is configured to be overcome by a user when adjusting a position of the elongated scribing element.

Another embodiment is directed to a method of making a profile matching scribing tool, the method comprising: forming an elongated body including walls defining an interior guide within the elongated body and having at least a first opening at one end of the elongated body; positioning an elongated scribing element, including a pointed tip, in the interior guide within the elongated body to be slidably extended out of the first opening; forming a marking tool guide holder on a top of the elongated body adjacent an end thereof and configured to guide and hold a marking tool transverse to the length of the elongated body; forming a marking tool storage holder on the elongated body and configured to store and hold the marking tool when not in use; and positioning first and second level indicators perpendicular to each other on the top of the elongated body.

Additionally, and/or alternatively, the method includes providing a scribing element tightening device to secure the elongated scribing element at a selected position in the interior guide within the elongated body.

Additionally, and/or alternatively, the method includes providing a marking tool tightening device on the marking tool guide holder to secure the marking tool within the marking tool guide holder.

Additionally, and/or alternatively, the interior guide extends the length of the elongated body and includes a second opening at an opposite end of the elongated body.

Additionally, and/or alternatively, the elongated scribing element is configured to be selectively extended out of either of the first and second openings of the interior guide within the elongated body.

Additionally, and/or alternatively, the elongated scribing element is substantially the same length as the elongated body.

Additionally, and/or alternatively, the elongated scribing element is secured in the interior guide within the elongated body by a slidable resistance that is configured to be overcome by a user when adjusting a position of the elongated scribing element.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

Figure 1:
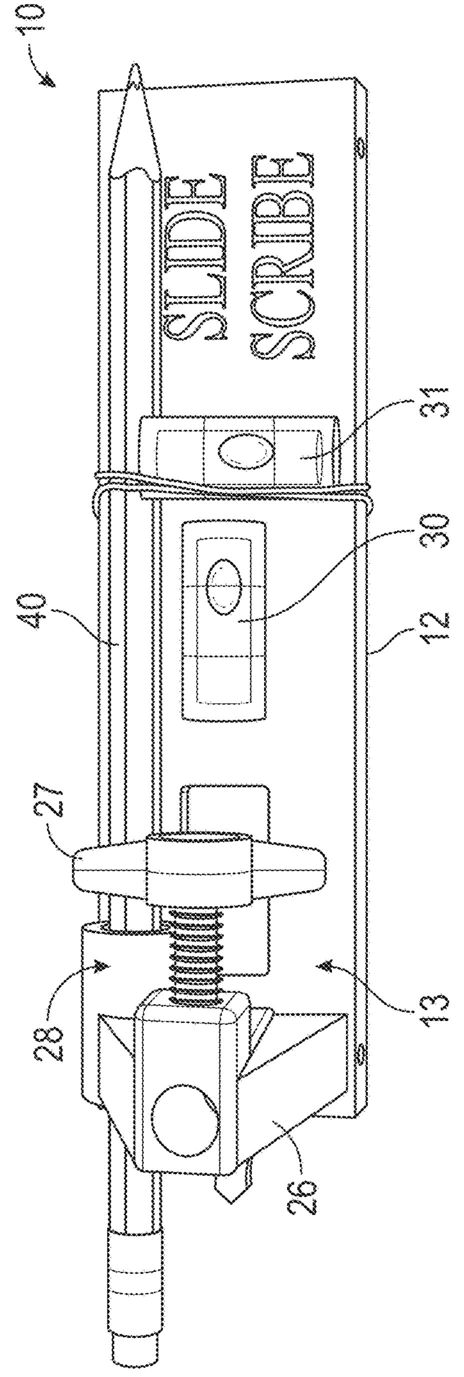
FIG. 1 is a top view illustrating an example embodiment of a profile matching scribing tool storing a marking device in accordance with features of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

FIGS. 1-6 illustrate an example embodiment of a profile matching scribing tool 10 (aka a contour gauge). Installing drywall and tile against log walls is extremely time consuming because of the variations in the thickness, width, and angle of the logs, for example. A typical contour gauge scribe tool has limited travel, making it unsuitable for typical dimensions of log houses. Many existing tools do not have the ability to ensure square, plumb, or level while marking. The profile matching scribing tool 10 of the present invention eliminates any guesswork while marking material to be cut.

The profile matching scribing tool 10 includes an elongated body 12 having walls 14 defining an interior guide 16 within the elongated body 12. The elongated body 12 has a first opening 18 at one end of the elongated body 12, and a second opening 19 at an opposite end of the elongated body 12. The elongated body 12 may be formed of plastic or metal, for example, or any other hard material capable of withstanding the forces experienced during typical or vigorous carpentry and masonry work.

Figure 2:
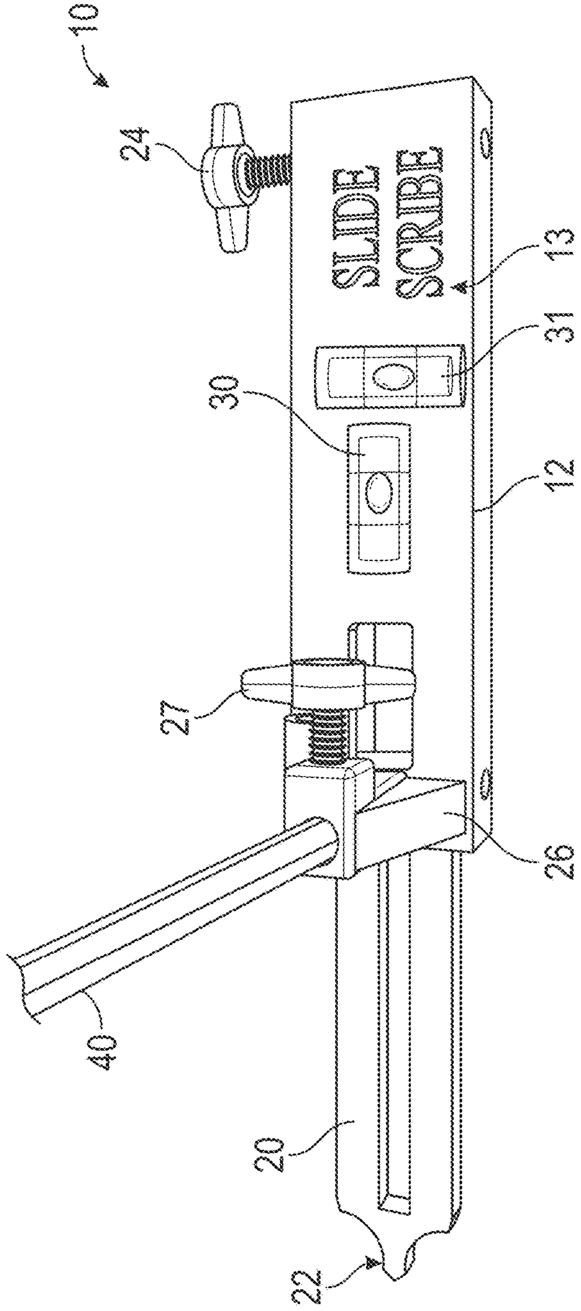
FIG. 2 is a perspective view illustrating details of the profile matching scribing tool of FIG. 1 with the scribing element extended and marking device secured.
Figure 3:
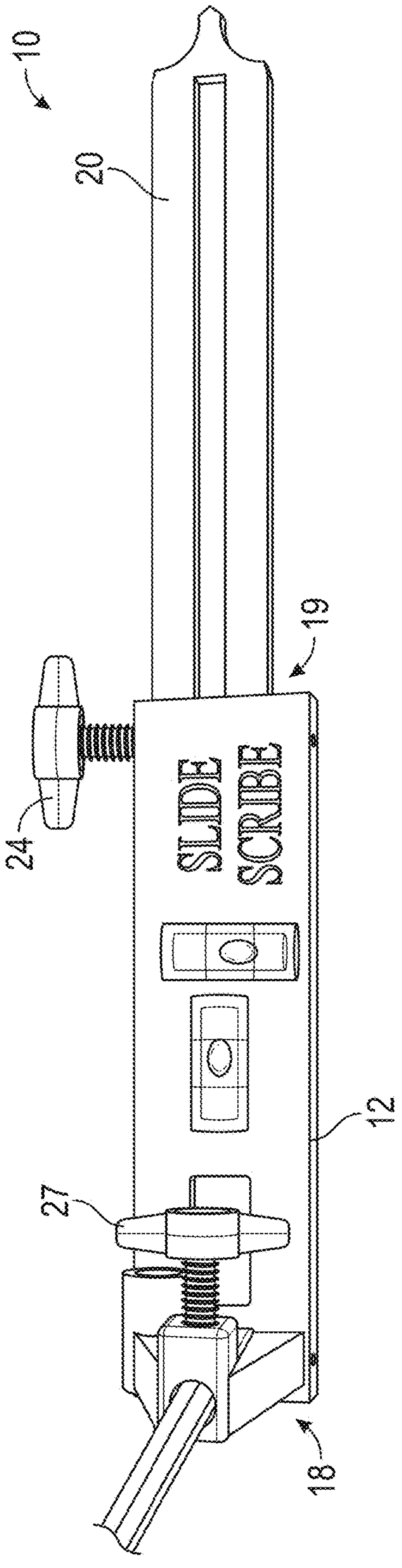
FIG. 3 is another top view illustrating details of the profile matching scribing tool of FIG. 1 with the scribing element extended from the opposite end.
Figure 4:
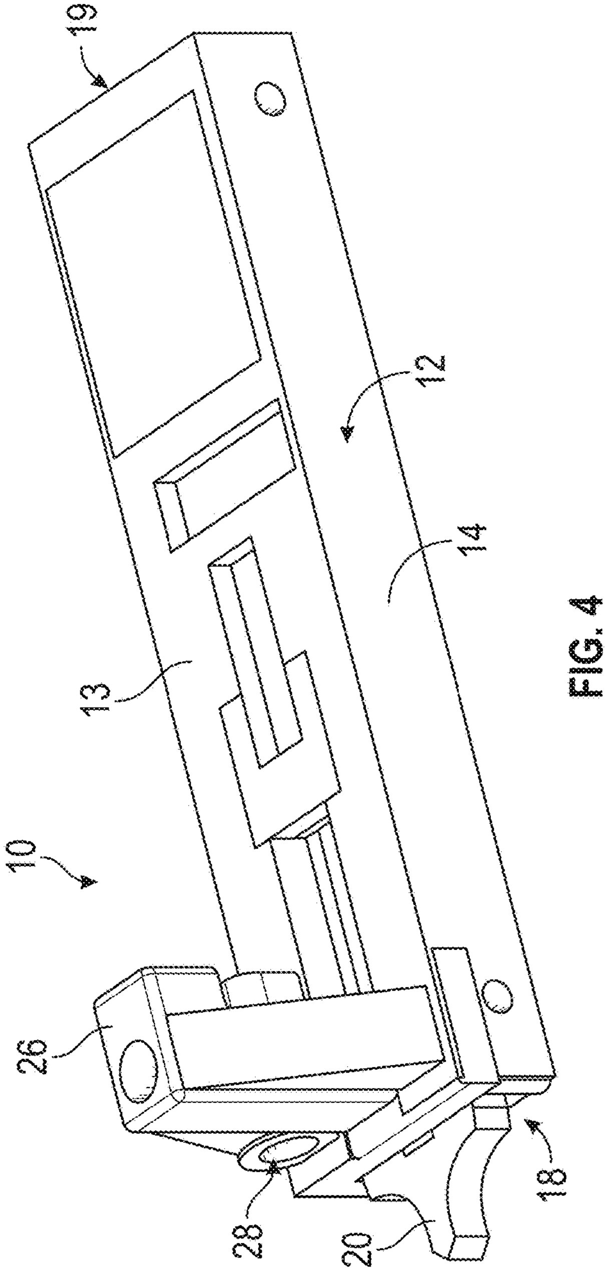
FIG. 4 is another perspective view illustrating details of the main components of the profile matching scribing tool of FIG. 1.
Figure 5:
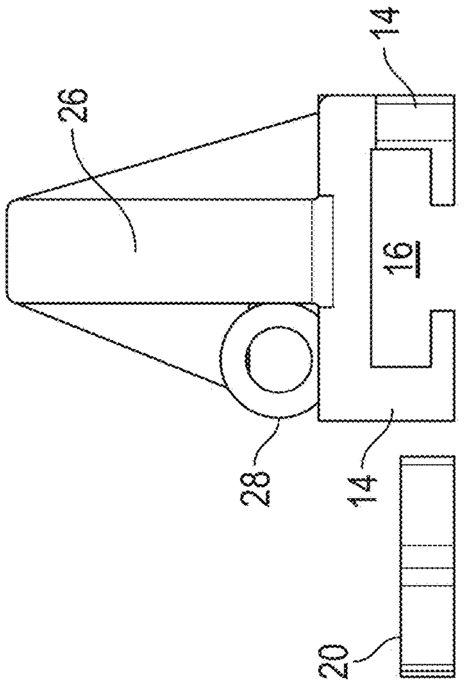
FIG. 5 is an end view illustrating details of the separated main components of the profile matching scribing tool of FIG. 1.
Figure 6:
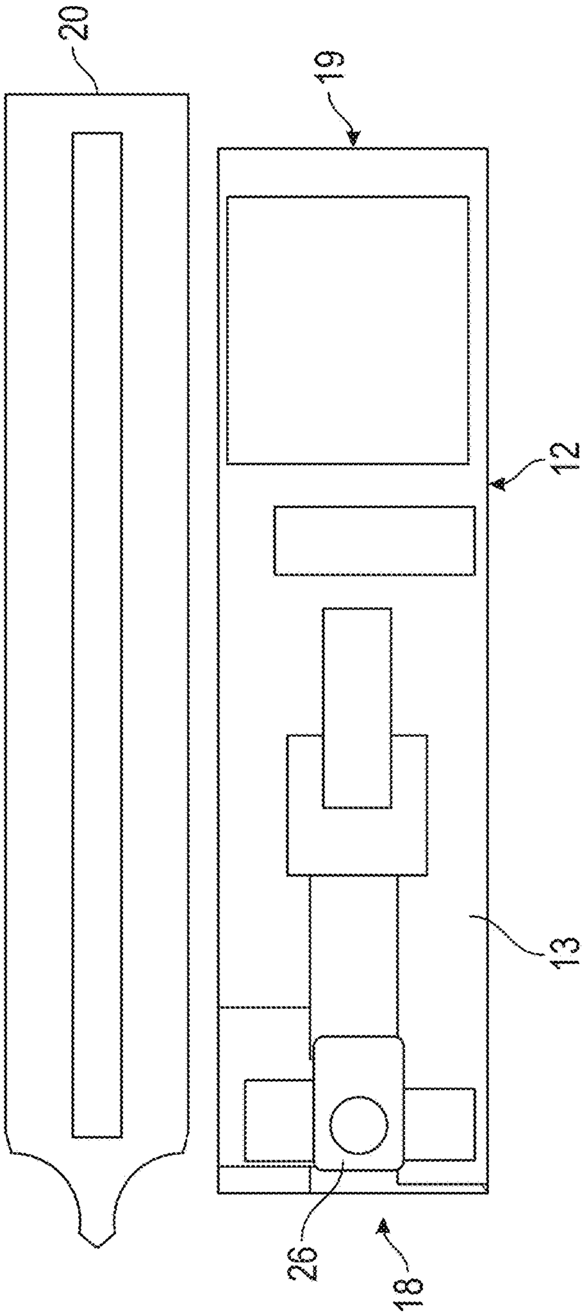
FIG. 6 is an top view illustrating details of the separated main components of the profile matching scribing tool of FIG. 1.

An elongated scribing element 20, including a pointed tip 22, is positioned in the interior guide 16 within the elongated body 12. The elongated scribing element 20 may be substantially the same length as the elongated body 12 as shown in FIG. 6. The elongated scribing element 20 includes a pointed tip 22. The elongated scribing element 20 is configured to be selectively and slidably extended out of the first opening 18 and/or the second opening 19. As such, the elongated scribing element 20 (e.g., as shown in FIG. 2) may be withdrawn from the interior guide 16 of the elongated body 12 via the first opening 18, reversed, and inserted via the second opening 19 into the interior guide 16 (e.g., as shown in FIG. 3) to extend the effective distance between the pointed tip 22 and a marking tool 40.

The elongated scribing element 20 may be secured in the interior guide 16 within the elongated body 12 by a slidable resistance (e.g., a friction fit) that is configured to be overcome by a user when adjusting a position of the elongated scribing element 20.

Additionally, one or more tightening devices 24, (e.g., a thumb screw, wing knob or wing nut) may be included to secure the elongated scribing element 20 at a selected position in the interior guide 16 within the elongated body 12.

A marking tool guide holder 26 is positioned on a top 13 of the elongated body 12 adjacent an end thereof. The marking tool guide holder 26 is configured to guide and hold a marking tool 40 (e.g., a pencil) transverse to the length of the elongated body 12. A marking tool tightening device 27 (e.g., a thumb screw, wing knob or wing nut) may positioned on the marking tool guide holder 26 and is configured to secure the marking tool 40 within the marking tool guide holder 26.

A marking tool storage holder 28 may be positioned on the top 13 of the elongated body 12 and is configured to store and hold the marking tool 40 when not in use.

Also, first and second level indicators 30/31 may be positioned perpendicular to each other on the top 13 of the elongated body 12.

In an exemplary embodiment, the profile matching scribing tool 10 measures 1½" wide by 6⅝" long by 2" tall when contracted. Its maximum length is 11¾" and height is variable to the height of the pencil when in use, width remains the same. It is primarily a three-piece profile matching scribing tool 10 comprised of the body 12, the tightly fitted elongated scribing element 20, and the marking tool 40 (e.g., pencil). The profile matching scribing tool 10 includes levels 30/31 on both the vertical and horizontal axis to ensure an accurate mark is made throughout the process for a user of any skill level. Thumbscrews 24 may be used in any of four threaded holes along the body 12 to lock in the slide 20 position, and an thumbscrew may also be used to restrict movement of the pencil 40. When not in use, the pencil 40 may be stored in a dedicated location, marking tool storage holder 28, on the body 12 and held there with a securing appliance (e.g., an elastic band) which allows the profile matching scribing tool 10 to easily fit in a tool belt.

To use the profile matching scribing tool 10: A user will measure the distance from a structure to the material to be marked and adjust the profile matching scribing tool 10 to that measurement, or simply extend the elongated scribing element 20 to the desired depth. The internal profile matching scribing tool 10 is reversible for larger depths. If desired, the thumbscrew 24 is used to lock the elongated scribing element 20 at the desired measurement (the internal tolerances of this tool may be extremely tight and locking the slide may not be necessary).

Next, the user will adjust the pencil depth in the holder 26 so that it will mark on the material and may lock the pencil in place with a thumbscrew 27. A biasing device (e.g., an elastic band) may be positioned around the hook on the housing, up and over the top (e.g., eraser) of the pencil 40 for a constant downward pressure (this may be useful when marking uneven material).

Finally, while maintaining the profile matching scribing tool 10 level or plumb by observing the installed bubble levels 30/31, the user will mark the material by keeping the pointed tip 22 of the elongated scribing element 20 along the structure and the pencil tip on the material to be marked.

The bubble levels 30/31 in the profile matching scribing tool 10 are preferably installed with precision, allowing this tool to replace a similar 6" level in a contractors' tool belt.

Thus, as described, the invention provides a carpentry and masonry marking tool that is adjustable from almost zero to a foot (e.g., adjustable from ¾" to 11¾"), and includes horizontal and vertical levels to ensure plumb/level throughout the marking process, especially when marking against an uneven surface such as log walls for drywall, cabinets, trim, and tile installation.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

The invention claimed is:

1. A profile matching scribing tool comprising:

an elongated body including walls defining an interior guide within the elongated body and having at least a first opening at one end of the elongated body;

an elongated scribing element, including a pointed tip, and positioned in the interior guide within the elongated body and configured to be slidably extended out of the first opening;

a marking tool guide holder positioned on a top of the elongated body adjacent an end thereof and configured to guide and hold a marking tool transverse to the length of the elongated body;

a marking tool storage holder positioned on the elongated body and configured to store and hold the marking tool when not in use; and first and second level indicators positioned perpendicular to each other on the top of the elongated body.

2. The profile matching scribing tool according to claim 1, further comprising a scribing element tightening device configured to secure the elongated scribing element at a selected position in the interior guide within the elongated body.

3. The profile matching scribing tool according to claim 1, further comprising a marking tool tightening device positioned on the marking tool guide holder and configured to secure the marking tool within the marking tool guide holder.

4. The profile matching scribing tool according to claim 1, wherein the interior guide extends the length of the elongated body and includes a second opening at an opposite end of the elongated body.

5. The profile matching scribing tool according to claim 4, wherein the elongated scribing element is configured to be selectively extended out of either of the first and second openings of the interior guide within the elongated body.

6. The profile matching scribing tool according to claim 1, wherein the elongated scribing element is substantially the same length as the elongated body.

7. The profile matching scribing tool according to claim 1, wherein the elongated scribing element is secured in the interior guide within the elongated body by a slidable resistance that is configured to be overcome by a user when adjusting a position of the elongated scribing element.

8. A profile matching scribing tool comprising:

an elongated body including walls defining an interior guide that extends the length of the elongated body and includes a first opening and a second opening at opposite ends of the elongated body;

an elongated scribing element, including a pointed tip, and positioned in the interior guide within the elongated body and configured to be selectively and slidably extended out of the first and second openings;

a marking tool guide holder positioned on a top of the elongated body adjacent an end thereof and configured to guide and hold a marking tool transverse to the length of the elongated body; and at least one level indicator positioned on the top of the elongated body.

9. The profile matching scribing tool according to claim 8, further comprising a scribing element tightening device configured to secure the elongated scribing element at a selected position in the interior guide within the elongated body.

10. The profile matching scribing tool according to claim 8, further comprising a marking tool tightening device positioned on the marking tool guide holder and configured to secure the marking tool within the marking tool guide holder.

11. The profile matching scribing tool according to claim 8, further comprising a marking tool storage holder positioned on the elongated body and configured to store and hold the marking tool when not in use.

12. The profile matching scribing tool according to claim 8, wherein the elongated scribing element is substantially the same length as the elongated body.

13. The profile matching scribing tool according to claim 8, wherein the elongated scribing element is secured in the interior guide within the elongated body by a slidable resistance that is configured to be overcome by a user when adjusting a position of the elongated scribing element.

14. A method of making a profile matching scribing tool, the method comprising:

forming an elongated body including walls defining an interior guide within the elongated body and having at least a first opening at one end of the elongated body;

positioning an elongated scribing element, including a pointed tip, in the interior guide within the elongated body to be slidably extended out of the first opening;

forming a marking tool guide holder on a top of the elongated body adjacent an end thereof and configured to guide and hold a marking tool transverse to the length of the elongated body;

forming a marking tool storage holder on the elongated body and configured to store and hold the marking tool when not in use; and positioning first and second level indicators perpendicular to each other on the top of the elongated body.

15. The method according to claim 14, further comprising providing a scribing element tightening device to secure the elongated scribing element at a selected position in the interior guide within the elongated body.

16. The method according to claim 14, further comprising providing a marking tool tightening device on the marking tool guide holder to secure the marking tool within the marking tool guide holder.

17. The method according to claim 14, wherein the interior guide extends the length of the elongated body and includes a second opening at an opposite end of the elongated body.

18. The method according to claim 17, wherein the elongated scribing element is configured to be selectively extended out of either of the first and second openings of the interior guide within the elongated body.

19. The method according to claim 14, wherein the elongated scribing element is substantially the same length as the elongated body.

20. The method according to claim 14, wherein the elongated scribing element is secured in the interior guide within the elongated body by a slidable resistance that is configured to be overcome by a user when adjusting a position of the elongated scribing element.

* * * * *